(12) United States Patent
Yamamoto

(10) Patent No.: US 7,295,364 B2
(45) Date of Patent: Nov. 13, 2007

(54) COLORANT, PARTICLES FOR DISPLAY DEVICE, IMAGE DISPLAY MEDIUM AND IMAGE FORMING APPARATUS

(75) Inventor: Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/301,667

(22) Filed: Dec. 13, 2005

(65) Prior Publication Data

US 2006/0279832 A1 Dec. 14, 2006

(30) Foreign Application Priority Data

Jun. 13, 2005 (JP) ............................. 2005-172779

(51) Int. Cl.
*G02B 26/00* (2006.01)
*G09G 3/34* (2006.01)

(52) U.S. Cl. ...................................... 359/296; 345/107

(58) Field of Classification Search ................ 359/295, 359/296, 290, 238; 345/107
See application file for complete search history.

(56) References Cited

U.S. PATENT DOCUMENTS

| | | | | |
|---|---|---|---|---|
| 5,603,815 | A * | 2/1997 | Lashmore et al. | 204/222 |
| 6,323,989 | B1 * | 11/2001 | Jacobson et al. | 359/296 |
| 2004/0244649 | A1 * | 12/2004 | Kato et al. | 106/403 |
| 2006/0089425 | A1 * | 4/2006 | Chopra et al. | 523/206 |
| 2007/0120814 | A1 * | 5/2007 | Moriyama et al. | 345/107 |
| 2007/0126694 | A1 * | 6/2007 | Moriyama et al. | 345/107 |

FOREIGN PATENT DOCUMENTS

JP 2001-312225 11/2001

OTHER PUBLICATIONS

Japanese Hardcopy '99 pp. 249-252.
Research Report 2002 (Research & Technical Strategy in Super Energy Saving Next Generation Flat Panel Display).

* cited by examiner

*Primary Examiner*—David N. Spector
(74) *Attorney, Agent, or Firm*—Fildes & Outland, P.C.

(57) ABSTRACT

Disclosed are a colorant comprising a particulate base material and particles having the color strength due to the surface plasmon resonance, the particles being supported on or contained in the particulate base material, particles for display device using the colorant, an image display medium using the particles for display device and an image forming apparatus using the image display medium.

12 Claims, 7 Drawing Sheets

COLORANT, PARTICLES FOR DISPLAY DEVICE, IMAGE DISPLAY MEDIUM AND IMAGE FORMING APPARATUS

This application claims priority under 35 USC 119 from Japanese Patent Application No. 2005-172779, the disclosure of which is incorporated by reference herein.

BACKGROUND OF THE INVENTION

1. Field of the Invention

The present invention relates to a colorant, particles for display device comprising the colorant, an image display medium and an image forming apparatus.

2. Description of the Related Art

Traditionally, various display techniques have been proposed as an image display medium repeatedly rewritable thereon, such as a Twisting Ball Display (bicolor saturationl particles rotational display) medium, an electrophoresis medium, a magnetophoresis medium, a thermal rewritable medium and a liquid crystal medium having a memorizing property. Although such display techniques are superb in image memorizing properties, problems have arisen insofar that it has not been possible to secure a white display like paper on a display screen only a low degree of contrast has been achieved.

In the meantime, as display technologies using a toner which technologies solve the above problem, display technologies have been reported in Japan Hardcopy'99 theses (page from 249 to 252), in which a conductive color toner and white particles are sealed between electrode substrates facing each other and charges are injected into the conductive color toner through a transfer layer, whereby the conductive color toner into which charges are injected is transferred to the display substrate side positioned opposite to a non-display substrate by the electric field applied across the substrates and the conductive color toner adheres to the inside of the display side substrate to display an image by the contrast between the conductive color toner and the white particles.

These display technologies are superior in the point that the image display medium is all constituted of solids and displays of white and black (color) can be switched one hundred percent in principle. In the above technologies, however, there is the problem that the conductive color toner which is not in contact with the charge transfer layer disposed on the inside surface of the electrode of the non-display substrate and the conductive color toner isolated from other conductive color toners are present. And these conductive color toners are not transferred by an electric field but exist at random inside of the substrate because no charge is injected, resulting in low contrast.

An image display medium comprising a pair of substrates and a group of particles that are sealed between these substrates in such a manner as to be movable between these substrates by applied electric field and contain plural types of particles for display (particles for display device) differing in color and charging characteristics is reported in the publication of Japanese Patent Application Laid-Open (JP-A) No. 2001-312225.

Also, organic pigments and inorganic pigments for coloring are used in particles for display device to colorize the image display medium.

However, these color organic pigments have the problem that they are unstable to light so that their colors are faded by light. Also, these color organic pigments have the drawbacks that a desired tinting strength is not obtained if the amount of the pigment to be added is not substantially increased with a reduction in the diameter of the particles for display device. The inorganic pigments, on the other hand, have the drawbacks that these pigments have small tinting strength and therefore, a desired tinting strength is not obtained if the amount of the pigment to be added to the particles for display device is not substantially increased. Also, fluorescent pigments are sometimes used to get a high color saturation. However, the particles diameter of the fluorescent pigment is large and it is therefore desired to develop a pigment having a small diameter to obtain a desired color tone. However, it is technically difficult to develop such a pigment.

As mentioned above, highly developed and highly color saturationtic color particles are desired as the particles for display device. Also, it is demanded of these particles have light fastness when these particles are exposed to light.

SUMMARY OF THE INVENTION

A first aspect of the present invention is to provide a colorant comprising a particulate base material and particles having the color strength due to the surface plasmon resonance, the particles being supported on or contained in the particulate base material.

A second aspect of the invention is to provide particles for display device comprising a colorant containing a particulate base material and particles having the color strength due to the surface plasmon resonance, the particles being supported on or contained in the particulate base material, and a resin.

A third aspect of the invention is to provide an image display medium comprising a pair of substrates disposed so as to face each other and a particle group containing at least two types of display particles, the particle group being sealed in the gap between the pair of substrates, the medium having the characteristics that at least one type among the display particles can be charged positively by external stimulation, and at least one other type can be charged negatively by external stimulation and the color of the display particles which can be charged positively by external stimulation is different from the display particles which can be charged negatively by external stimulation, wherein at least one type of the display particles is particles for display device containing a colorant and a resin and the colorant contains a particulate base material and particles having the color strength due to the surface plasmon resonance, the particles being supported on or contained in the particulate base material.

A fourth aspect of the invention is to provide an image forming apparatus comprising an image display medium comprising a pair of substrates disposed so as to face each other and a particle group containing at least two types of display particles, the particle group being sealed in the gap between the pair of substrates, the medium having the characteristics that at least one type among the display particles can be charged positively by external stimulation, and at least one other type can be charged negatively by external stimulation and the color of the display particles which can be charged positively by external stimulation is different from the display particles which can be charged negatively by external stimulation, wherein at least one type of the display particles is particles for display device containing a colorant and a resin and the colorant contains a particulate base material and particles having the color strength due to the surface plasmon resonance, the particles being supported on or contained in the particulate base material; and electric field generating device that generates an electric field corresponding to image information, the device being interposed between the pair of substrates.

DETAILED DESCRIPTION OF THE INVENTION

Figure 1:
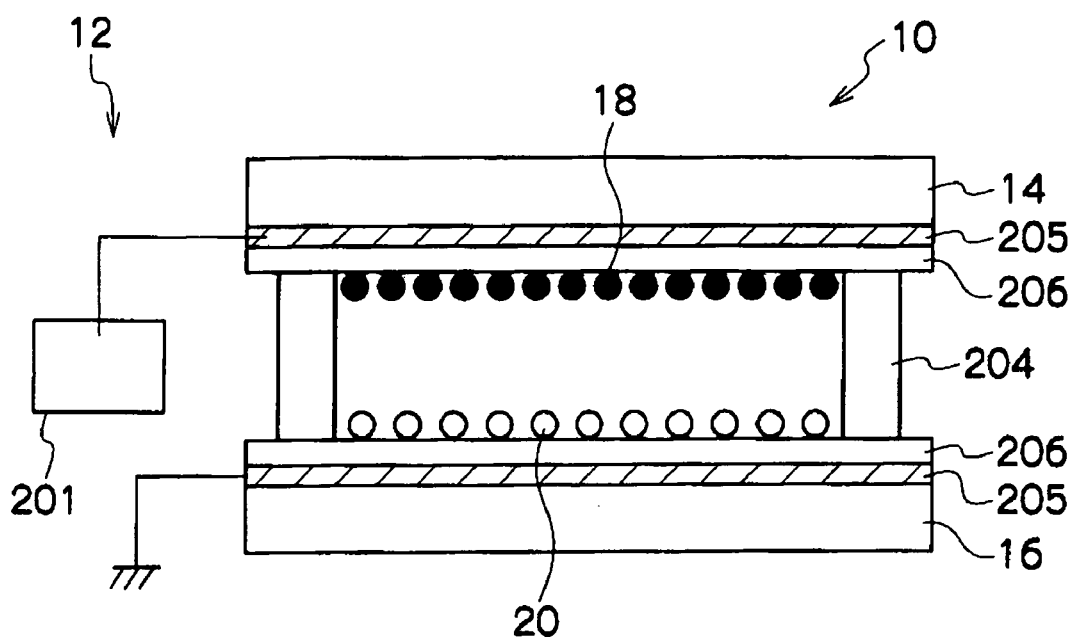
FIG. 1 is a schematic structural view showing one example (first embodiment) of an image forming apparatus of the present invention.

A colorant, particles for display device, an image display medium and an image forming apparatus of the present invention will be hereinafter explained in detail.

<Colorant>

The colorant of the invention comprises a particulate base material and particles (hereinafter, particles having the color strength due to the surface plasmon resonance are referred to as "plasmon particles") having the color strength due to the surface plasmon resonance, the particles being supported on or contained in the particulate base material.

The plasmon particles are metal microparticles called nanoparticles having a particles diameter of about several nm to tens of nm. These particles have high color saturation and high light ray transmittance and are superior in light fastness. However, since these plasmon particles are microparticles, it is difficult to handle these particles as they are. The colorant of the invention is one prepared by making a particulate base material support or contain plasmon particles and this structure improves the handling characteristics of the particles while making use of the merit of plasmon particles.

Although there is no particular limitation to the plasmon particles according to the invention, the plasmon particles according to the invention are preferably metal colloid particles having the color strength due to the surface plasmon resonance from the viewpoint of colorability and stability. The metal colloid particles will be described hereinbelow: however the invention is not limited by these explanations.

Examples of the metal of the above metal colloid particles include noble metals or copper (hereinafter collectively called "metal"). No particular limitation is imposed on the noble metal and examples of these noble metals may include gold, silver, ruthenium, rhodium, palladium, osmium, iridium, platinum, and alloys of these metals, for example, platinum-gold and platinum-palladium. The color tone of the plasmon particles varies with the size of particles diameter and therefore, particularly gold or silver is preferable in the invention from the viewpoint of the easiness of the control of a particles diameter of 1 nm to 100 nm.

As a method of producing the plasmon particles to be used in the invention, there are a physical method used to obtain nanoparticles by using a small bulk metal and a chemical method used to obtain nanoparticles by taking out metal atoms (zero valence) from a precursor such as a metal salt or metal complex and coagulating these metal atoms. Specific examples of the physical method include an atomizing method, in-gas evaporation method, sputtering method and laser ablation method. In a wet method, a precursor such as metal ions or metal complexes is introduced and, first, a metal complex is thermally decomposed or a metal ion is reduced to obtain metal particles. Examples of the reducing agent used to reduce these metal ions include an alcohol, polyol, aldehyde, citric acid or its salt, ascorbic acid or its salt, hydrazine, hydrogen, diborane, boron hydride metal salt, boron hydride alkyl quaternary ammonium salt, alcohol amines and phosphorous.

In the method of producing plasmon particles by a laser ablation method, a pulse laser is used to apply a laser to a metal ingot sunk on the bottom of a beaker to release a metal atom and a metal cluster in water.

The volume average particles diameter of the plasmon particles is preferably 1 to 100 nm and particularly preferably 5 to 50 nm.

In addition, the plasmon particles can be made to develop various colors by selecting the type of metal and the shape and volume average particles diameter of the particles. Various hues including RGB developed colors can be obtained by using the plasmon particles of which the type of metal, shape and volume average particles diameter are controlled.

The volume average particles diameter of the metal colloid particles to exhibit each color of R, G and B in a RGB system cannot be particularly limited because it depends on the type of metal to be used, and the condition of the preparation or shape of the particles. For example, in the case of gold colloid particles, there is a tendency that the particles develop colors in the order of R, G and B as the volume average particles diameter is increased.

In a method of measuring the average particles diameter in the invention, a group of particles are observed by a transmission type electron microscope to calculate the circle equivalent diameter by an image analysis method, thereby finding the average particles diameter.

Any material may be used as the particulate base material used in the invention without any particular limitation insofar as it can support or contain plasmon particles. For example, an inorganic compound or a polymer compound may be used. Specific examples of the inorganic compound include titanium oxides, zeolite, glass, silica, calcium carbonate, magnesium carbonate, tin oxide and zinc oxide. Among these compounds, the particulate base material is preferably made of at least one type selected from titanium oxides, silica and zeolite which are superior in the degree of whiteness and thermal stability, in particular, the particulate base material is preferably made of at least one type selected from titanium oxides and zeolite.

Specific examples of the polymer compound particles include various polyester resin particles, polyether sulfone resin particles, activated carbon fibers, crosslinked polymethylmethacrylate microparticles, urethane resin particles and crosslinked styrene resin microparticles. Among these compounds, polyether sulfone resin particles, crosslinked polymethylmethacrylate microparticles, urethane resin particles and crosslinked styrene resin microparticles which are superior in thermal stability are preferable.

The particulate base material preferably has pores to make the particulate base material support or contain the plasmon particles. A particulate base material having pores is a material which is the so-called nanoporous material having a number of fine pores (holes). Examples of the nanoporous material which may be used in the invention may include porous glass, activated carbon fibers, nanoporous silicon, ultra fine porous zeolite, nanoporou organic resins, nanoporous titanium oxides and Fullerene. As a method of synthesizing the particulate base material having these pores, an appropriate method can be selected from various production methods that have been variously proposed.

The size of the pore is preferably 1000 nm or less, more preferably 100 nm or less and particularly preferably 80 nm or less.

Next, a method of producing the colorant of the invention will be explained taking the case of using the particulate base material having pores as an example.

The particulate base material having pores is dispersed in a dispersion solution in which the plasmon particles are dispersed and the solvent of the dispersion solution is gradually vaporized with stirring to dry, thereby supporting the plasmon particles in the pores. Moreover, the particulate base materials may be rubbed with each other to push the plasmon particles into the pores by using a method in which child particles are mixed with parent particles to form complex particles by friction heat and thus the colorant of the invention can be obtained.

The colorant of the invention may also be produced by measures for producing the plasmon particles (metal colloid) by using a chemical method in a solvent, in which plasmon particles are deposited or supported on the surface of these polymer particles under the presence of the polymer particles, following the polymer particles are dried to make a pigment.

As the solvent to be used in this case, a solvent having a relatively low boiling point is selected. Examples of the solvent include methanol, ethanol, acetone, tetrahydrofuran, toluene, methylene chloride and acetonitrile.

Also, a method may be adopted in which the dried plasmon particles and the particulate base material are mixed with each other and the mixture is treated using a hybridizer, angmill or kneader to push the plasmon particles into pores by mechanical impact.

When the polymer compound is used as the particulate base material, the polymer compound preferably contains an inorganic white pigment. This improves the masking effect of white particles to thereby obtain an image display having a higher display contrast.

Specific examples of the inorganic white pigment include titanium oxides, zeolite, calcium carbonate and magnesium carbonate. It is preferable to use at least one type selected from titanium oxides and zeolite as an inorganic white material because titanium oxides and zeolite are thermally stable so that a wide production condition can be used.

The method of producing the colorant of the invention when using a polymer compound containing an inorganic white material as the particulate base material is as follows. Examples of the method include a method in which the inorganic white pigment is mixed with a thermoplastic resin by thermal fusion, cooled, then milled and micronized; a method in which the inorganic white pigment is dispersed in an organic solvent in which a resin is dissolved in advance, then the solvent is removed, the residue is dried and milled, and micronized; and a method using an emulsion polymerization method in which the inorganic pigment and a monomer are dispersed and mixed, the mixture is dispersed in a solvent poor to the monomer and polymerized by heat or light.

The volume average particles diameter of the colorant of the invention is preferably 0.1 to 20 µm, more preferably 1 to 10 µm and particularly preferably 1 to 5 µm.

The colorant of the invention may be provided with a coating layer covering the particulate base material. If the coating layer is provided, the plasmon particles fall down from the particulate base material can be prevented.

Examples of a material constituting the coating layer may include resins such as a vinyl resin, polyester resin, phenol resin and polyurethane resin, and various coupling agents such as a silane coupling agent and titanate coupling agent.

Examples of the silane coupling agent may include vinyltrimethoxysilane and γ-methacryloxypropyltrimethoxysilane. Examples of the titanate coupling agent may include isopropyltristearoyl titanate and isopropylmethacrylisostearoyl titanate.

The coating layer may be formed, for example, by dispersing the particulate base material carrying or containing the plasmon particles in a solution in which materials constituting the coating layer is dissolved and by spray-coating the solution, followed by drying. The coating layer may also be formed by dispersing the particulate base material which carries or contains the plasmon particles in a solution in which materials constituting the coating layer are dissolved, to adsorb the coating layer-constituting materials to the particulate base material, followed by evaporating a solvent and drying.

Particles for Display Device

The particles for display device of the invention contain the colorant (comprising the particulate base material and the plasmon particles) of the invention and a resin and may contain an antistatic agent and other components according to the need.

Examples of the resin constituting the particles for display device include polyvinyl type resins such as polyolefin, polystyrene, acryl resin, methacryl resin, polyacrylonitrile, polyvinyl acetate, polyvinyl alcohol, vinyl chloride and polyvinylbutyral; vinyl chloride/vinyl acetate copolymers; styrene/acrylic acid copolymers; copolymer resins such as styrene/methacrylic acid copolymer; straight silicon resins constituted of organosiloxane bonds and their modified resins; fluororesins such as polytetrafluoroethylene, polyvinyl fluoride and polyvinylidene fluoride; polyesters, polyurethanes, polycarbonates; amino resins; and epoxy resins.

Also, as the resin that is structural component of the particles for display device of the invention, known binder resins which are known as the major component of conventional electrophotographic toners may be used without any problem.

These resins may be used either singly or by mixing plural resins. Also, one obtained by crosslinking these resins may be used. Among these materials, it is particularly preferable to use a resin containing a crosslinked component.

An antistatic agent may be added to the particles for display device of the invention to control the antistatic properties.

Known compounds used for electrophotographic toner materials may be used as the antistatic agent. Examples of the antistatic agent may include cetylpyridyl chloride, quaternary ammonium salts such as P-51 and P-53 (manufactured by Orient Chemical Industries, Ltd.), salicylic acid type metal complexes, phenol type condensates, tetraphenyl type compounds, Calyx allene compounds and also metal oxide microparticles or metal oxide microparticles which are surface-treated by various coupling agents. Also, as the antistatic agent, those which are non-colored and have low tinting strength are preferable. The amount of the antistatic agent to be added is preferably in a range from 0.1 to 10% by mass and more preferably in a range from 0.5 to 5% by mass.

In addition, a resistance regulator may be added to the particles for display device according to the need.

An inorganic micropowder having a resistance of $1 \times 10^6$ Ωcm or less may be used. Examples of the resistance regulator may include tin oxide, titanium oxides, zinc oxide, iron oxide and microparticles coated with various conductive oxides (e.g., titanium oxides coated with tin oxide). The resistance regulator is preferably those having non-color or those having low tinting strength. The amount of the resistance regulator to be added is preferably in the range in which the color of the particles for display device is not hindered and is specifically in a range preferably from 0.1% by mass to 10% by mass.

Colorants other than the colorants of the invention may be added to the particles for display device of the invention. Examples of the other colorants include cobalt violet, manganese violet, cobalt blue, ultramarine, cerulean blue, prussian blue, manganese blue, viridian, chromoxite green, cobalt green, tail belt, earth green, cadmium yellow, yellow ochre, nickel titan yellow, bismuth vanadium yellow, chrome yellow, cadmium orange, red lead, chrome vermilion, vermilion, iron oxide red, sienna earth, amber earth, bandike brown, ivory black, peach black, lamp black, mars black, complex oxide black, titanium white, silver white, zinc white and ceramic white.

Also, typically preferable pigments as other colorants having color saturationtic colors may include aniline blue, Chalcoil blue, Du Pont Oil Red, quinoline yellow, methylene blue chloride, phthalocyanine blue, malachite green oxalate, Rose Bengale, C.I. Pigment Red 48:1, C.I. Pigment Red 122, C.I. Pigment Red 57:1, C.I. Pigment Yellow 97, C.I. Pigment Blue 15:1 and C.I. Pigment Blue 15:3.

These other colorants may be added in the amount range in which the color development of plasmon is not hindered. The amount of these colorants is preferably 1 to 5% by mass.

The aforementioned other additives as well as the aforementioned each component may also be used to the extent that the hue of the particles for display device is not adversely affected. Examples of such an additive as those used to drop the specific gravity of the particles for display device may include polymer particles having a smaller particles diameter than the diameter of the particles for display device. As these polymer particles, conventionally known polymers may be used. In this case, it is preferable to use a polymer having a lower specific gravity than the specific gravity of the colorant to be combined. Also, when the polymer particles itself has color saturation, it is preferably selected properly to use in consideration of the color saturation of the colorant contained in the particles for display device.

Examples of materials which can be used for the polymer particles include polystyrene resin, polymethyl methacrylate resin, urea formalin resin, styrene-acrylic resin, polyethylene resin, and polyvinylidene fluoride resin, either alone or in combination; however, these are not the only examples usable. These resins preferably have a cross-linking structure, and more preferably have a refractive index higher than that of the resins contained in the particles for display device.

Polymer particles can have a spherical form, an indeterminate form, or a flat form, and preferably a spherical form.

There is no particular limitation to the volume average particles diameter of the polymer particles insofar as it is smaller than that of the particles for display device. However, the volume average particles diameter of the polymer particles is preferably 10 μm or less and more preferably 5 μm or less. Also, the polymer particles preferably have a sharp grain size distribution and are preferably a mono-dispersed system.

Moreover, a part or all of the polymer particles are preferably constituted of hollow particles from the viewpoint of manufacturing the particles for display device which particles have a small volume average particles diameter. Although no particular limitation is imposed on the volume average particles diameter of the hollow particles insofar as it is lower than the particles for display device, the volume average particles diameter is preferably 10 μm or less and more preferably 5 μm or less. In the case of, particularly, hollow particles, the volume average particles diameter is still more preferably in a range from 0.1 to 1 μm and particularly preferably in a range from 0.2 to 0.5 μm.

Here, the "hollow particles" mean those having voids therein. The void ratio is preferably from 10 to 90%. Also, the "hollow particles" may be those put in a hollow capsulated state or those having a porous outside wall.

Also, the degree of whiteness can be raised and masking properties can be improved by utilizing the scattering of light caused by a difference in refractive index between the resin layer of the outer shell part and the air layer of the inside of the particles in the case of the hollow particles put in the hollow capsulated state or by a difference in refractive index between the outside wall and the cavity in the case of the hollow particles having a porous outside wall. Therefore, it is particularly preferable that these hollow particles exist inside of the white particles for display devices.

In the particles for display device of the invention, the amount of the polymer particles (hollow particles) is preferably in a range from 1 to 40% by mass and more preferably 1 to 20% by mass based on the whole particles for display device.

The particles for display device of the invention may be produced by a wet production method such as suspension polymerization, emulsion polymerization or dispersion polymerization or may be produced by a conventional milling-classifying method. Particles obtained by the wet method are spherical particles and particles obtained by the milling-classifying method are particles having an undefined shape.

Also, heat treatment may be carried out to make uniform the shape of the obtained spherical particles or particles having an undefined shape.

Examples of a method for making the shape uniform include a method in which the granulating condition in the aforementioned wet methods is controlled and a method in which the particles obtained once are subjected to a classifying process.

In the case of controlling the granulating condition in the wet method, the rate of stirring when dispersing the oil phase in which materials constituting the display particles are dispersed, in a water phase is controlled or the concentration of a surfactant, if the surfactant is used, is regulated, whereby the grain size distribution of the particles can be controlled.

For the purpose of applying a classifying operation to the particles, for example, it is possible to use various kinds of vibrating sieves, ultrasonic sieves, air sieves, wet-type sieves, rotary classifiers based on the principle of a centrifugal force, and wind power classifiers; however, these are not the only approaches usable. These can be used either alone or in combination to obtain a desired particles size distribution of particles for display device. In particular, for precision adjustment, wet-type sieves are preferable. In the case of using a classifier, for example a rotary classifier, controlling the number of revolutions can remove the ingredients on the fine particles side/large particles side selectively from the particles which have not yet been classified. As the sieve, a nylon sieve is preferable because its aperture has a narrow distribution and can obtain a high yield.

The volume average particles diameter of the particles for display device is, though not the in a wholesale manner, preferably in a range from about 0.1 to 30 μm, more preferably in a range from 2 to 20 μm and still more preferably in a range from 2 to 15 μm to obtain a good image.

The shape of the particles for display device of the invention is preferably close to a true sphere. If the particles have a shape close to a true sphere, the contact of particles among them is almost point contact and also, the contact of the particles for display device with the inside surface of the substrate is also almost point contact, resulting in a reduction in adhesion based on van der Waals force of the particles among them and van der Waals force between the particles for display device and the inside surface of the substrate. Therefore, even if the inside surface of the substrate is conductive, charged particles are considered to travel smoothly in the substrate by an electric field. Specifically, the shape factor SF1 of the particles for display device is preferably 100 to 140, more preferably 100 to 120 and particularly preferably 100 to 110.

Here, the shape factor SF1 in the invention means the value defined by the following equation.

$$SF1 = 100 \times \pi \times ML^2 / 4A$$

where SF1 represents a shape factor, ML represents an absolute maximum length of the particles and A represents the projected area of the particles. ML and A can be measured using, for example, a Luzex image analyzer (trade name: FT, manufactured by Nireco Corporation).

The particles for display device of the invention contain the colorant of the invention and is therefore superior in light fastness.

Display particles other than the particles for display device of the invention can be produced in the same method as above.

Image Display Medium

The image display medium of the invention comprises a pair of substrates disposed so as to face each other and a particle group containing at least two types of display particles, the particle group being sealed in the gap between the pair of substrates, the medium having the characteristics that at least one type among the display particles can be charged positively by external stimulation, and at least one other type can be charged negatively by external stimulation and the color of the display particles which can be charged positively by external stimulation is different from the display particles which can be charged negatively by external stimulation, wherein at least one type of the display particles is particles for display device containing a colorant and a resin and the colorant contains a particulate base material and particles having the color strength due to the surface plasmon resonance, the particles being supported on or contained in the particulate base material. Accordingly, the image display medium of the invention uses the particles for display device of the invention.

In the image display medium of the invention, particles which are positively charged (hereinafter referred to as "first particles" as the case may be) and particles which are negatively charged (hereinafter referred to as "second particles" as the case may be) have colors differing from each other and therefore, a concentration contrast is obtained between image parts made of the first particles and image parts made of the second parts. Also, in the image display device of the invention, the display particles according to the invention are used as at least one of the first and second particles and it is therefore possible to provide an image display medium which has excellent light fastness with the result that it can stand to outdoor use for a long period of time.

In the image display medium of the invention, one of the display particles is preferably a white one and, in another words, a white type colorant is preferably contained in one of the display particles. The tinting strength of other particles and concentration contrast can be improved by allowing one of the particles to be white-colored. At this time, titanium oxides is preferable as the white type colorant to allow one of the particles to be whitened. The use of titanium oxides as the colorant makes it possible to improve the masking ability in the wavelength range of the visible light to be able to more improve the concentration contrast. A rutile type titanium oxides is particularly preferable as the white type colorant.

The substrate constituting the image display medium of the invention will be explained hereinbelow.

In the image display medium of the invention, a pair of substrates disposed so as to face each other are used and the display particles are sealed in the gap between the paired substrates.

Here, when controlling the charged state of the display particles that can be charged positively or negatively by using an electric field as external stimulation, a conductive plate body (conductive substrate) is used as the substrate. In this case, it is necessary that at least one of the pair of substrates be a transparent conductive substrate to provide a function as an image display medium. In this case, the side on which the transparent conductive substrate of the image display medium is disposed is an image display plane.

As the conductive substrates, the substrates themselves may be conductive, or a conductivity imparting treatment may be applied to insulating supporting surfaces, and whether they are crystalline or amorphous does not matter. Examples of a conductive substrate in which the substrate itself is conductive include: metals such as aluminum, stainless steel, nickel, and chrome, and their alloy crystals, and semiconductors such as Si, GaAs, GaP, GaN, SiC, and ZnO.

Examples of the insulating support include: polymer film, glass, quartz, and ceramic. The conductivity imparting treatment of the insulating support can be done by forming film from gold, silver, copper, and the like in addition to the metals mentioned as the examples of the conductive substrate in which the substrate itself is conductive by a deposition method, a spattering method, an ion plating method, or the like.

As the transparent conductive substrate, a conductive substrate obtained by forming a transparent electrodes on one surface of an insulating transparent support, or a transparent support which is conductive itself can be used. Examples of the transparent conductive materials for the transparent support which is conductive itself include: ITO (Indium-Tin Oxide), zinc oxide, tin oxide, lead oxide, indium oxide, and copper iodine.

The insulating transparent support can be made from transparent inorganic material such as glass, quartz, sapphire, MgO, LiF, or $CaF_2$; a transparent organic resin such as fluororesin, polyester, polycarbonate, polyethylene, polyethylene terephthalate, or epoxy in the form of film or plate; optical fiber, or Selfoc optical plate.

The transparent electrodes provided on one side of the aforementioned transparent support can be made from transparent conductive material such as ITO, zinc oxide, tin oxide, lead oxide, indium oxide, or copper iodine, and the transparent electrodes can be formed by evaporation, ion plating or spattering, or can be made from metal such as Al, Ni, or Au to form into as thin as to be semitransparent by vapor deposition or spattering.

The surfaces on the sides on which the substrates face each other (which hereinafter may be referred to as the "counter surfaces") may affect the charging polarities of the display particles. Therefore, the counter surfaces are preferably provided with a protective layer having an appropriate surface condition.

The material of this protective layer may be selected primarily in the viewpoint of the adhesion of the display particles to the counter surfaces of the substrate, the electrification rank of the display particles and the transparency of the substrate and further, from the viewpoint of preventing the counter surface from being contaminated. Specific examples of the material used for the protective layer may include a polycarbonate resin, vinyl silicone resin and fluorine-containing resin. The resin is selected from those reduced in the difference of the frictional charge from that of materials constituting the surface of the display particles or that of display particles.

Image Forming Apparatus

The image forming apparatus of the invention comprises the aforementioned image display medium of the invention and an electric field generating means that generates an electric field corresponding to image information which means is interposed between the pair of substrates relating to the display medium.

An embodiment of the image forming apparatus of the invention using the image display medium of the invention will be explained in detail with reference to the drawings. Here, parts having the same functions are designated by the same symbols throughout all drawings and there is the case where the explanations of the parts are omitted.

First Embodiment

FIG. 1 is a simplified structural view of an example (first embodiment) of the image forming apparatus of the invention.

The image forming apparatus 12 according to the first embodiment is provided with a voltage applying means 201 as shown in FIG. 1. An image display medium 10 is provided with a display substrate 14 on the side on which an image is displayed, a non-display substrate 16 facing the display substrate 14 and a spacer 204 disposed so as to seal the outside peripheries of these two substrates. Red particles 18 and white particles 20 are sealed as display particles in the gap partitioned by the display substrate 14, the non-display substrate 16 and the spacer 204. A transparent electrode 205 is disposed on the side facing each of the display substrate 14 and the non-display substrate 16. The transparent electrode 205 disposed on the side facing the non-display substrate 16 is grounded and the transparent electrode 205 disposed on the side facing the display substrate 14 is connected to a voltage applying means 201.

Next, the details of the image display medium 10 will be explained by giving specific examples of individual structures.

As the display substrate 14 and non-display substrate 16 constituting the image display medium 10, a 7059 glass substrate may be used which has a size of 50×50×1.1 mm and is provided with an ITO transparent electrode as the transparent electrode 205 on the opposite surface. A polycarbonate resin layer 206 (a 5-μm-thick layer constituted of a polycarbonate resin (PC-Z)) is formed on the surface of the transparent electrode 205 on the side facing each of the display substrate 14 and the non-display substrate 16.

As the spacer 204, one produced by cutting a 15×15 mm square out of the center part of a 40×40×0.3 mm silicon rubber plate to form a hollow space may be utilized.

This silicon rubber plate is disposed on the side facing the non-display substrate 16 in the production of the image display medium 10. Next, for example, spherical white particles 20 containing titanium oxides having an average particles diameter of 20 μm and red particles 18 containing the colorant having an average particles diameter of 20 μm according to the invention are mixed in a ratio by mass of 3/2. Then, about 15 mg of the mixture particles are shaken down on the square cut part on the silicon rubber plate disposed on the side facing the non-display substrate 16 through a screen. Thereafter, the side facing the display substrate 14 is bought into close contact with this silicon rubber plate and both substrates are kept under pressure by a double clip to allow the both to be stuck to each other to form an image display medium 10.

Here, the particles for display device are used as the red particles 18.

Second Embodiment

A second embodiment of the invention will be described in detail as follows, with reference to the drawings.

Figure 2:
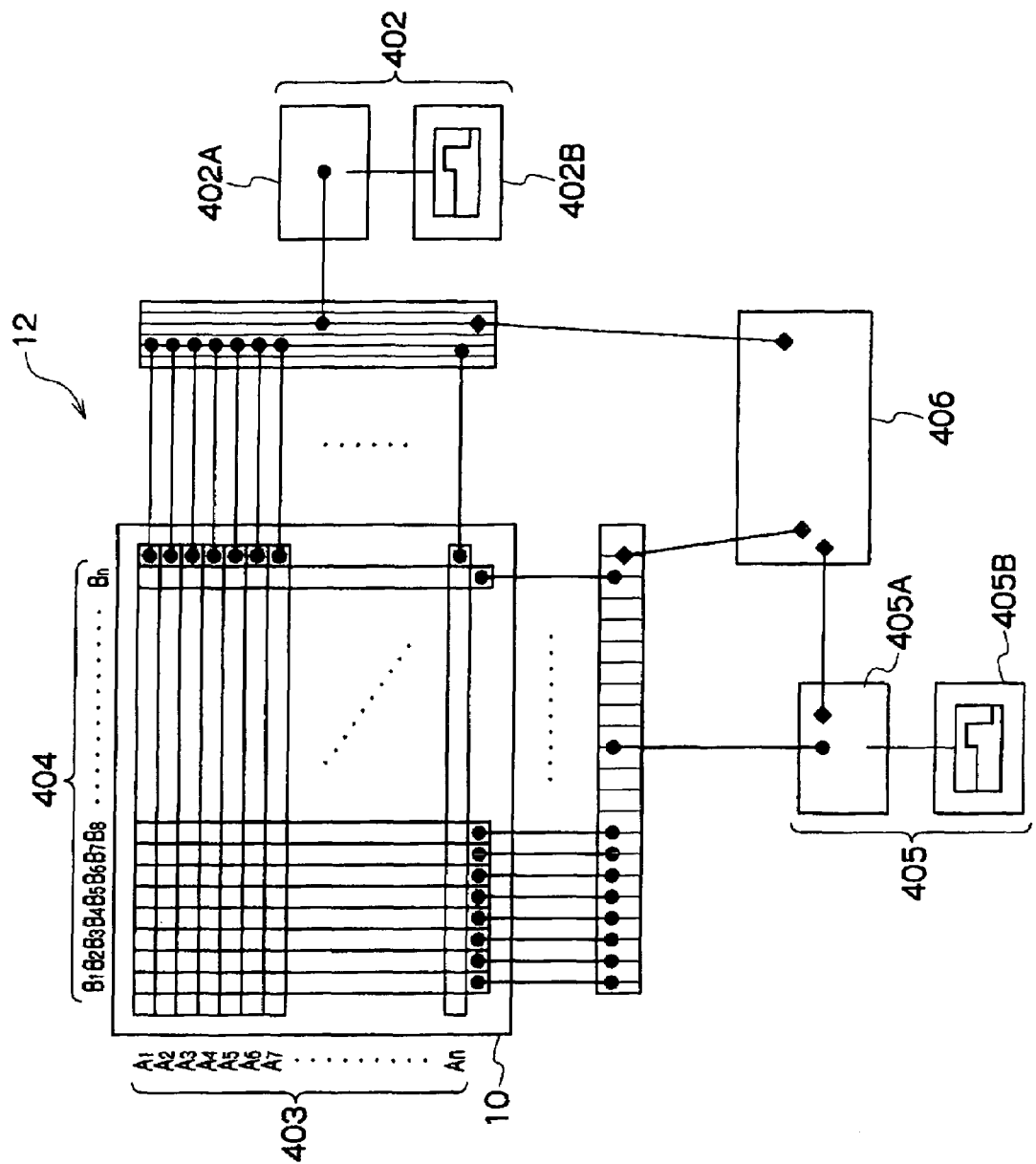
FIG. 2 is a schematic structural view showing another example (second embodiment) of an image forming apparatus of the invention.

FIG. 2 is a simplified structural view of another example (second embodiment) of the image forming apparatus of the invention, and shows the image forming apparatus 12 for forming images on the image display medium 10 using a simple matrix.

In the plane direction of the image display medium 10 into which plural (unillustrated) types of display particles having different charging properties have been sealed, electrodes 403An and 404Bn (n is a positive number) for controlling the voltages in the vertical and lateral directions are arranged to form a simple matrix structure. The electrodes 403An are connected with a power source 405A of the electric field generator 405 which has a waveform generator 405B and the power source 405A. The electrodes 404Bn are connected with a power source 402A of an electric field generator 402 having a waveform generator 402B and the power source 402A. The electrodes 404Bn, the power source 405A, and the electrodes 403An are connected with a sequencer 406.

In displaying images, the electric field generator 402 or 405 makes the electrodes 403An or 404Bn generate potentials, and the sequencer 406 controls the timing of driving the potentials of the electrodes, thereby controlling the driving of the voltages of the electrodes. This provides the electrodes 403Al to An on one side with an electric field capable of driving the display particles in the unit of one line, and at the same time, provides the electrodes 404B1 to Bn on the other side with an electric field according to image information.

Figure 3:
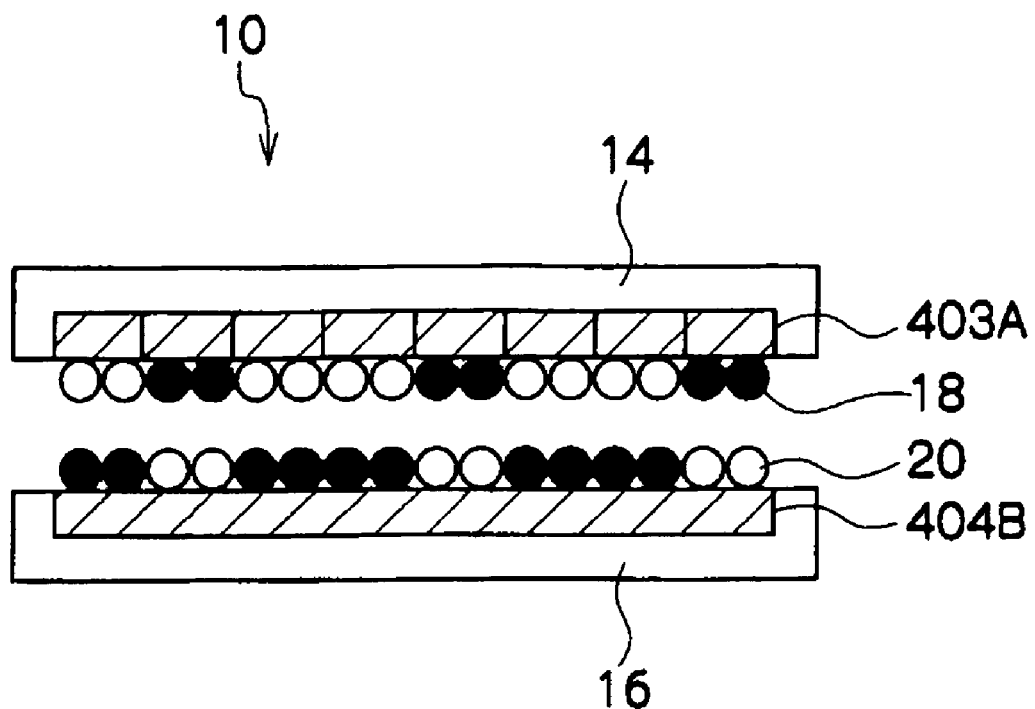
FIG. 3 shows one example of a typical sectional view of an image forming part (image display medium 10) along an optional plane of the image forming apparatus 12 shown in FIG. 2.
Figure 4:
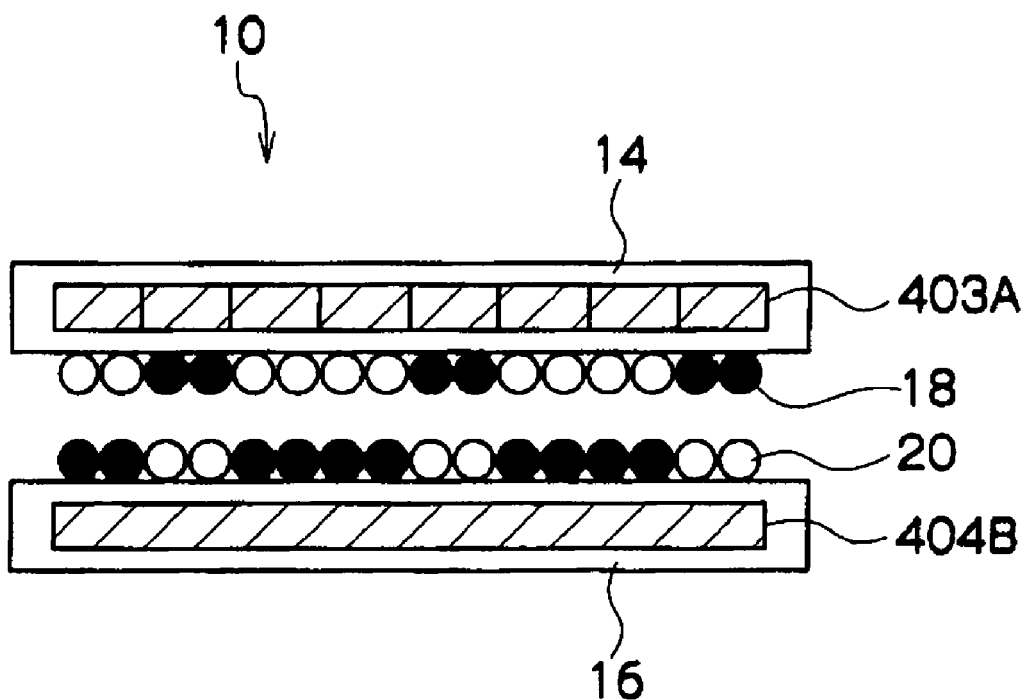
FIG. 4 shows another example of a typical sectional view of an image forming part (image display medium 10) along an optional plane of the image forming apparatus 12 shown in FIG. 2.
Figure 5:
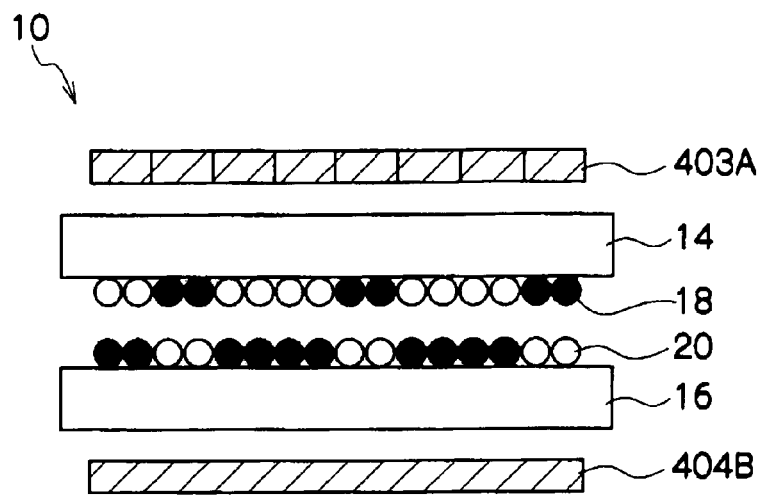
FIG. 5 shows a further example of a typical sectional view of an image forming part (image display medium 10) along an optional plane of the image forming apparatus shown in FIG. 2.

FIGS. 3 to 5 show schematic cross sectional views of the image forming part (image display medium 10) on an arbitrary surface of the image forming apparatus 12 shown in FIG. 2.

The particles 18 and 20 for display devices are in contact with the electrode surfaces or the substrate surfaces, and at least one side of the substrate 14 or 16 is transparent to make it possible to see through the colors of the particles 18 and 20 for display devices from outside. As shown in FIG. 3, the electrodes 403A and 404B may be integrally embedded in respective counter surface portion where the substrates 14 and 16 face each other, or as shown in FIG. 4, the electrodes 403A and 404B may be integrally embedded inside the substrates 14 and 16. Or as shown in FIG. 5, the electrodes 403A and 404B may be placed a little apart from the surfaces of the display substrate 14 and the non-display substrates 16 that are opposite to the surfaces of the display substrate 14 and the non-display substrates 16 facing each other.

Setting an electric field appropriately to the image forming apparatus 12 can achieve a display by a simple matrix driving. It is possible to drive the particles 18 and 20 for display devices as long as these particles have a threshold to move to the electric field, and there are no limits to the color, charging polarities, charging amount, and the like of the particles 18 and 20 for display devices.

Third Embodiment

Figure 6:
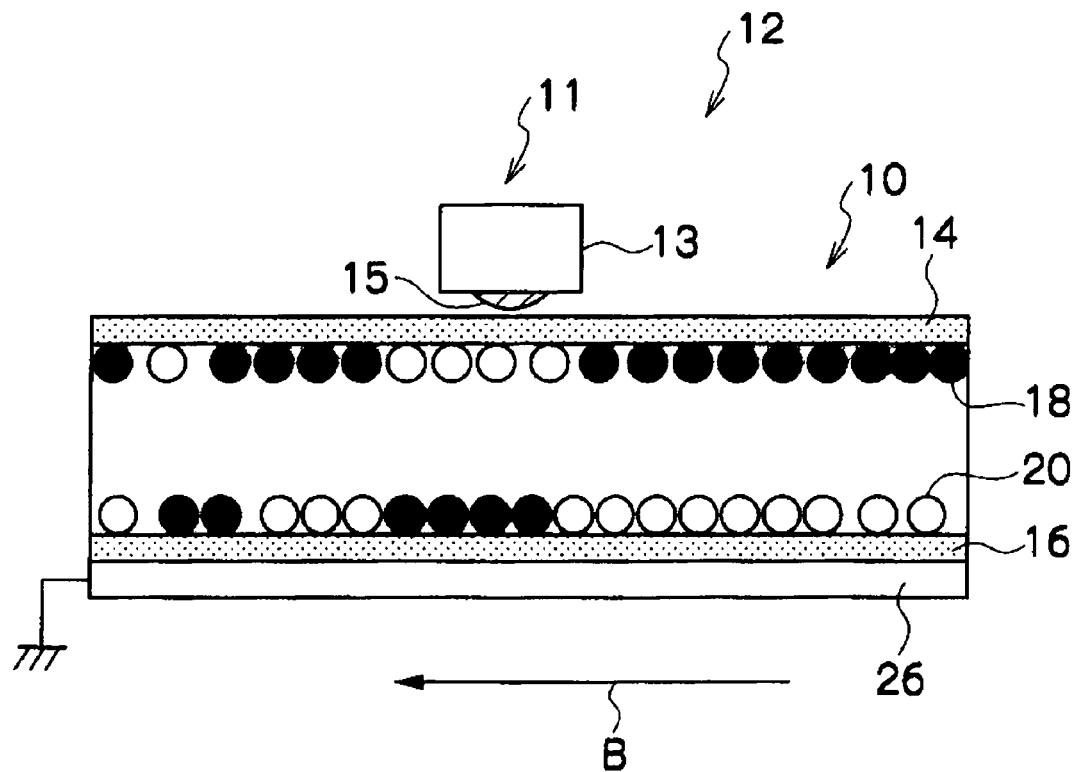
FIG. 6 is a schematic structural view showing a further example (third embodiment) of an image forming apparatus of the invention.

The third embodiment of the invention will be hereinafter explained in detail with reference to the drawings. FIG. 6 is a schematic structural view showing another example (third embodiment) of the image forming apparatus, showing, specifically, an image forming apparatus using a printing electrode.

An image forming apparatus 12 shown in FIG. 6 is constituted of a printing electrode 11 and a counter electrode 26 which is disposed so as to face the printing electrode 11 and connected to the earth.

The image display medium 10 is designed to be movable in the direction of the arrow B through the space between the printing electrode 11 and the counter electrode 26. The image display medium 10 is constituted of a pair of substrates (display substrate 14 and non-display substrate 16) and the particles 18 and 20 sealed between these substrates. When the image display medium 10 is conveyed in the direction of the arrow B, it is conveyed such that the non-display substrate 16 side is made to be close to or in contact with the counter electrode 26 and the display substrate side is close to the printing electrode 11.

In this case, the printing electrode 11 is constituted of a substrate 13 and an electrode 15 disposed on the display substrate 14 side of the substrate 13, wherein the printing electrode 11 is connected to a power source (though not shown).

Figure 7:
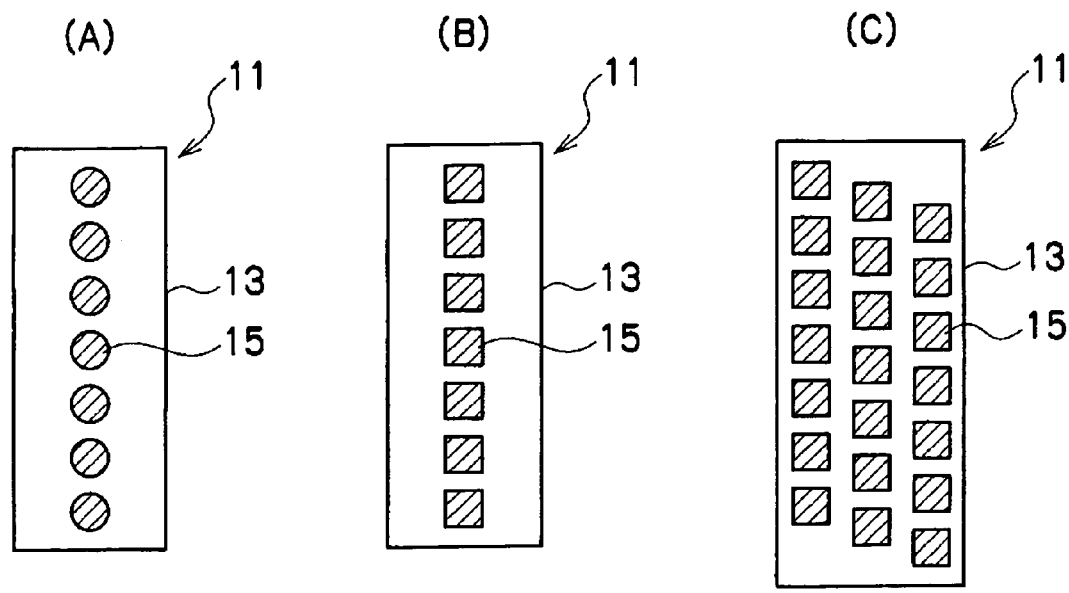
FIG. 7 is a typical view showing an electrode pattern of a printing electrode.

Next, the position and shape of the electrodes 15 disposed on the display substrate 14 side of the printing electrode 11 will be explained. FIG. 7 is a typical view showing an example of an electrode pattern disposed on the printing electrode and shows the case where the surface of the printing electrode 11 on which surface the electrodes 15 are formed is viewed from the non-display substrate 16 side in the direction of the display substrate 14.

As shown in FIG. 7(A), the electrodes 15 are arranged in one line on one side of the display substrate 14 at fixed intervals corresponding to the resolution of an image along a direction (namely, main scanning direction) almost perpendicular to the direction (the direction of the arrow B in the figure) of the travel of the image display medium 10. The electrode 15 may have a square form as shown in FIG. 7(B) or may be disposed matrix-wise as shown in FIG. 7(C).

Figure 8:
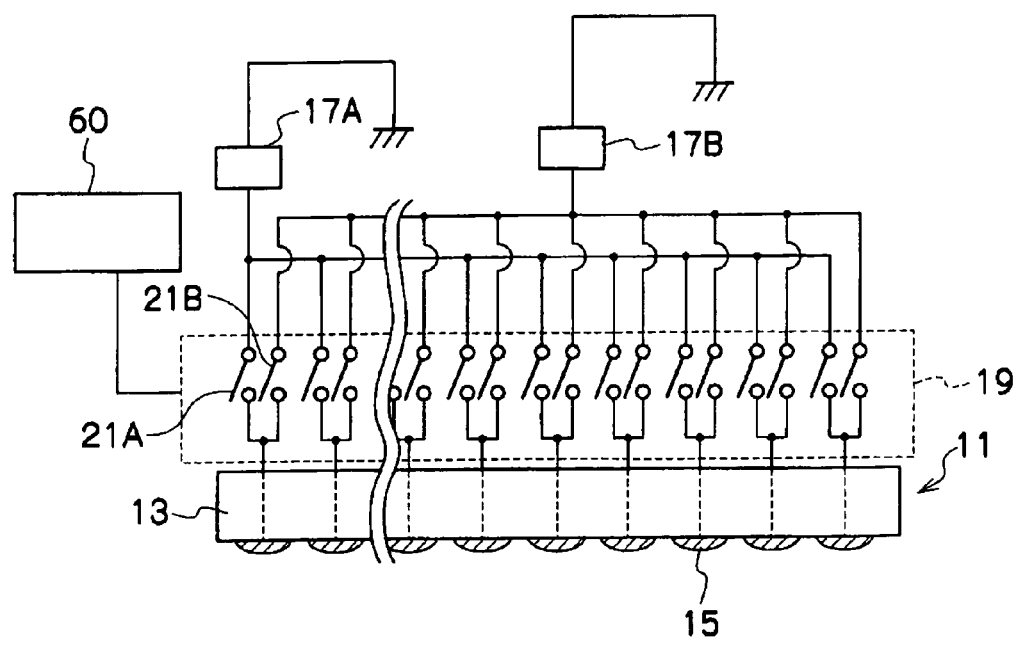
FIG. 8 is a schematic structural view of a printing electrode.

Next, the details of the printing electrode will be explained. FIG. 8 shows the schematic structural view of the printing electrode.

An AC power source 17A and a DC power source 17B are connected to each electrode 15 through a connecting control section 19 as shown in FIG. 8. The connecting control section 19 is constituted of plural switches comprising a switch 21A of which one terminal is connected to the electrode 15 and the other terminal is connected to the AC power source 17A and a switch 21B of which one terminal is connected to the electrode 15 and the other terminal is connected to the DC power source 17B.

These switches 21A and 21B are respectively turned on and off under control by a control section 60 to electrically connect the AC power source 17A or DC power source 17B to the electrode 15. This makes it possible to apply AC voltage, DC voltage or AC-DC superimposed voltage.

Next, the action in the third embodiment will be explained.

First, the image display medium 10 is conveyed in the direction of the arrow B by a conveying means though not shown. When the image display medium 10 is conveyed to the place between the printing electrode 11 and the counter electrode 26, the control section 60 directs a connecting control section 19 to turn on all the switches 21A. This allows AC voltage to be applied to the electrode 15 from the AC power source 17A.

Here, the image display medium 10 is a medium in which two or more types of particle groups for display devices are sealed in a space between the paired substrates with no electrode.

When AC voltage is applied to the electrode 15, the red particles 18 and white particles 20 in the image display medium 10 are moved reciprocatively between the display substrate 14 and the non-display substrate 16. This reciprocating motion causes the friction between the display particles and the friction between the particles of display device and the substrate, whereby the red particles 18 and the white particles 20 are charged by friction. For example, the red particles 18 are positively charged and the white particles 20 are not charged or negatively charged. It is to be noted that the following explanations will be furnished on the premise that the white particles 20 are negatively charged.

Then, the control section 60 directs the connecting control section 19 to turn on only the switch 21B corresponding to the electrode 15 at the position in accordance to image data to apply DC voltage to the electrode 15 at the position in accordance to the image data. For example, DC voltage is applied to a non-image portion and DC voltage is not applied to an image portion.

By this structure, when DC voltage is applied to the electrode 15, the positively charged red particles 18 which exist at the portion where the printing electrode 11 is facing the display substrate 14 travel to the non-display substrate 16 side by the effect of the electric field. Also, the white particles 20 which exist on the non-display substrate 16 side and are negatively charged travel to the display substrate 14 side by the effect of the electric field. Therefore, only the white particles 20 appear on the display substrate 14 side and no image is therefore displayed on the portion corresponding to a non-image portion.

When DC voltage is not applied to the electrode 15, on the other hand, the red particles 18 which exist at the portion where the printing electrode 11 is facing the display substrate 14 and are positively charged are hold at the same position on the display substrate 14 side as they are by the effect of the electric field. Also, the red particles 18 which exist on the non-display substrate 16 side and are positively charged are made to travel to the display substrate 14 side by the effect of the electric field. Accordingly, only the red particles 18 appear on the display substrate 14 side and an image is displayed on the part corresponding to an image portion.

This allows only the red particles 18 to appear on the display substrate 14 side and therefore an image is displayed at the portion corresponding to an image portion.

In this manner, the red particles 18 and the white particles 20 travel corresponding to an image to display an image on the display substrate 14 side. In the case where the white particles 20 are not charged, only the red particles 18 travels due to the effect of the electric field. The red particles 18 at the position where no image is displayed travel to the non-display substrate 16 and are masked with the white particles 20 as viewed from the display substrate 14 side, and therefore image can be displayed. Also, even after the electric field generated between the substrates of the image display medium 10 disappears, the displayed image is kept by the adhesion specific to the display particles. Also, because these display particles can travel again if an electric field is generated between the substrates, an image can be displayed repeatedly by the image forming apparatus 12.

As mentioned above, the display particles which particles are charged using air as a medium are allowed to travel by an electric field and this apparatus is highly safe. Also, because air has low viscous resistance, high-speed responsive ability can be satisfied.

Fourth Embodiment

Figure 9:
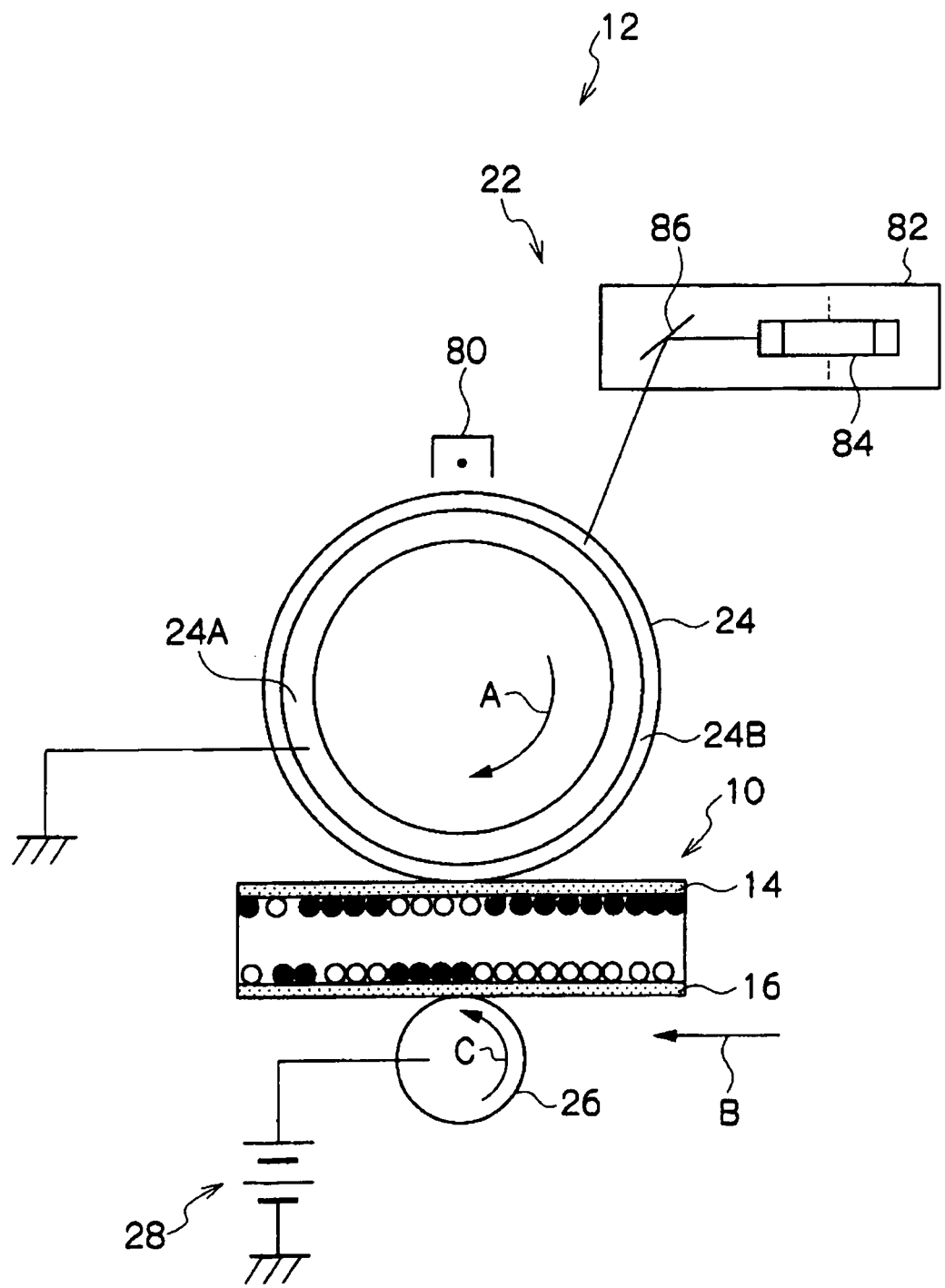
FIG. 9 is a schematic structural view showing a further example (fourth embodiment) of an image forming apparatus of the invention.

A fourth embodiment of the invention will be described in detail as follows with reference to the drawings. FIG. 9 is a simplified structural view of another example (fourth embodiment) of the image forming apparatus of the invention, showing the image forming apparatus using an electrostatic latent image carrier.

The image forming apparatus 12 shown in FIG. 9 is mainly composed of a drum-shaped electrostatic latent image carrier 24 rotatable in the direction of the arrow A and a drum-shaped counter electrode 26 which is disposed to face the body 24 and is rotatable in the direction of the arrow C. The image display medium 10 having display particles sealed between a pair of substrates can pass through between the electrostatic latent image carrier 24 and the drum-shaped counter electrode 26 in the direction of the arrow B.

A charging device 80 is disposed near the outer surface of the electrostatic latent image carrier 24 which is on the side nearly opposite to the counter electrode 26. An optical beam scanning device 82 is disposed in a position that enables electrostatic latent images to be formed on the portion of the surface of the electrostatic latent image carrier 24 which is on the arrow A side of the charging device 80. These three components compose an electrostatic latent image forming part 22.

As the electrostatic latent image carrier 24, a photosensitive drum 24 can be used. The photosensitive drum 24 has a structure that a photoconductive layer 24B is formed on the outer side of a drum-shaped conductive substrate 24A made of aluminum or SUS. As the photoconductive layer 24B, well-known various materials can be used. Examples of the materials include: inorganic photoconductive materials such as α-Si, α-Se, and $As_2Se_3$, and organic photoconductive materials such as PVK/TNF. These materials can be formed by plasma CVD, deposition, or dipping. A charge transport layer or an overcoat layer may be formed when necessary. The conductive substrate 24A is grounded.

The charging device 80 uniformly charges the surface of the electrostatic latent image carrier 24 with a desired potential. The charging device 80 can be anything as long as it can charge the surface of the electrostatic latent image carrier 24 with an arbitrary potential. The present embodiment adopts corotron which uniformly charges the surface of the electrostatic latent image carrier 24 by applying a high voltage to an electrode wire and generating a corona discharge between the wire and the electrostatic latent image carrier 24. Besides this, various well-known chargers can be used such as those which make a conductive roll member, brush member, or film member come into contact with the photosensitive drum 24 so as to supply it with a voltage, thereby charging the surface of the photosensitive drum.

The light beam scanning device 82 applies a micro spot light beam onto the surface of the charged electrostatic latent image carrier 24 based on an image signal, thereby forming latent images on the electrostatic latent image carrier 24. The light beam scanning device 82 can be anything as long as it applies an optical beam onto the surface of the photosensitive drum 24 according to image information, thereby forming latent images on the uniformly charged photosensitive drum 24. The present embodiment adopts an ROS (Raster Output Scanner) which turns on and off the laser beam adjusted to have a specific spot size according to an image signal by using an image-forming optical system having a polygon mirror 84, a reflecting mirror 86, and an unillustrated optical source and lens which are provided inside the optical beam scanning device 82, thereby optically scanning the surface of the photosensitive drum 24 by the polygon mirror 84. Besides this, an LED head in which LEDs are arranged according to a desired resolution may be used.

The counter electrode 26 is constituted of, for example, a conductive roll member having elasticity. The counter electrode 26 can be thereby stuck to the image display medium 10 more firmly. Also, the counter electrode 26 is disposed at the position counter to an electrostatic latent image supporter 24 through the image display medium 10 conveyed in the direction of the arrow B in the figure by a conveying means which is not shown. A DC power source 28 is connected to the counter electrode 26. A bias voltage $V_B$ is applied to the counter electrode 26 from this DC voltage power source 28. When the potential at the part taking positive charges on the electrostatic latent image support 24 is $V_H$ and the potential at the part taking no charge is $V_L$, this bias voltage $V_B$ is designed to be intermediate potential between the both as shown in FIG. 10.

Next, the action in a fourth embodiment will be explained.

When the rotation of the electrostatic latent image support 24 is started in the direction of the arrow A in FIG. 9, an electrostatic latent image is formed on the electrostatic latent image support 24 by the electrostatic latent image forming part 22. On the other hand, the image display medium 10 is conveyed in the direction of the arrow B in the figure by a conveying means which is not shown to the place between the electrostatic latent image support 24 and the counter electrode 26.

Figure 10:
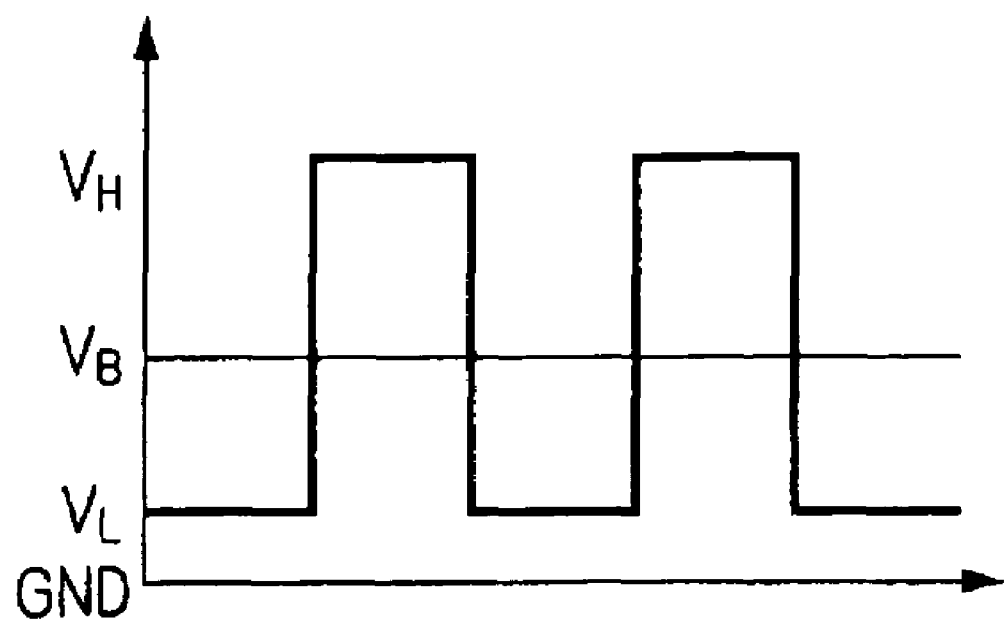
FIG. 10 is a view showing the voltage of an electrostatic latent image support and counter electrode.

Here, a bias voltage $V_B$ is applied to the counter electrode 26 as shown in FIG. 10 and the potential of the electrostatic latent image support 24 at the position facing the counter electrode 26 is $V_H$. Therefore, when the part of the electrostatic latent image support 24 which part faces the display substrate 14 takes a positive charge (non-image portion) and the red particles 18 are stuck to the part of the display substrate 14 which part faces the latent image support 24, the red particles 18 positively charged travel to the non-display substrate 16 side from the display substrate 14 side and stuck to the non-display substrate 16. By this action, only the white particles 20 appear on the display substrate 14 side and therefore, no image is displayed on the part corresponding to a non-image portion.

On the other hand, when the part of the electrostatic latent image support 24 which part faces the display substrate 14 does not take a positive charge (image portion) and the red particles 18 are stuck to the part of the non-display substrate 16 which part faces the counter electrode 26, the charged red particles 18 travel to the display substrate 14 side from the non-display substrate 16 side and stuck to the display substrate 14 because the potential of the electrostatic latent image support 24 at the position corresponding to the counter electrode 26 is $V_L$. By this action, only the red particles 18 appear on the display substrate 14 side and therefore, an image is displayed on the part corresponding to an image portion.

In this manner, the red particles 18 travel corresponding to an image to display an image on the display substrate 14 side. Here, even after the electric field generated between the substrates of the image display medium 10 disappears, the displayed image is kept by the adhesion specific to the particles and the image-force between the particles and the substrates. Also, because these red particles 18 and white particles 20 can travel again if an electric field is generated between the substrates, an image can be displayed repeatedly by the image forming apparatus 12.

Since bias voltage is applied to the counter electrode 26 in this manner, the red particles 18 can be made to travel even if the red particles 18 are stuck to any one of the display substrate 14 and the non-display substrate 16. Therefore, it is unnecessary to stick the red particles 18 in advance to one substrate side. Also, an image having a high contrast and high sharpness can be formed. Moreover, because particles charged through air as the medium is made to travel by an electric field, this system is highly safe. Also, because air has low viscous resistance, high-speed response ability can be satisfied.

An embodiment of the image forming apparatus of the invention using the image display device of the invention was explained with reference to the drawings as above. However, the image forming apparatus of the invention is not limited to these embodiments and may have a desired structure. Also, though red and white are used as a combination of the colors of the display particles, the combination of the colors of the display particles is not limited to this and display particles which have a desired color may be properly selected according to the need.

EXAMPLES

The present invention will be explained by way of examples, which are, however, not intended to be limiting of the invention. It is to be noted that in the following examples and comparative examples, an image display medium and an image forming apparatus (the image display medium and image forming apparatus shown in FIG. 1) according to the foregoing first embodiment are used. At this time, the size and quality of each member are designed to be the same as those mentioned above.

Production of a Red Colorant 1 part by mass of 1% gold chloride acid and 80 parts by mass of ion exchange water are placed in a beaker, are mixed with stirring and heated to 60° C. A mixture of 4 parts by mass of 1% citric acid and 6 parts by mass of 1% tannic acid is added quickly to the solution. After the color of the solution is changed to red, the solution is treated under heat for about 8 minutes.

The gold nanoparticles synthesized in this manner are observed by a transmission type electron microscope and the diameter of the particles is measured by an image analyzer and as a result, these particles are red gold particles having a diameter of 9 nm.

Next, this mixed solvent is dried slowly to obtain a red powder.

3 Parts by mass of the red gold particles and 97 parts by mass of acryl resin microparticles (trade name: SX8703 (A)-01, manufactured by JSR Corporation) are mixed with each other and the mixture is subjected to an Ang-mill (manufactured by Hosokawamicron Corporation) operated at a peripheral speed of 100 m/sec for a processing time of 10 minutes, to obtain a red colorant.

Production of White Particles-1

Preparation of a Dispersion Solution A1

The following components are mixed and the mixture is subjected to ball mill crushing using a 10 mm$\phi$ zirconia ball for 20 hours to prepare a dispersion solution A1.

Composition

| | |
|---|---|
| Cyclohexylmethacrylate: | 61 parts by mass |
| Titanium oxide 1 (white pigment) (trade name: Taipake CR63, manufactured by Ishihara Sangyo Kaisha Ltd., primary particles diameter: 0.3 μm): | 35 parts by mass |
| Hollow particles (trade name: SX866 (A), manufactured by JSR Corporation, primary particles diameter: 0.3 μm) | 3 parts by mass |
| Antistatic agent (trade name: SBT-5-0016, manufactured by Orient Kogyo (sha)) | 1 part by mass |

Preparation of a Calcium Carbonate Dispersion Solution B

The following components are mixed and the mixture is pulverized in the same manner as above to prepare a calcium carbonate dispersion solution B.

<Composition>

| Calcium carbonate: | 40 parts by mass |
|---|---|
| Water: | 60 parts by mass |

Preparation of a Mixed Solution C

The following components are mixed and the mixture is deaerated for 10 minutes, followed by stirring using an emulsifier to prepare a mixed solution C.

<Composition>

| Calcium carbonate dispersion solution B: | 8.5 g |
|---|---|
| 20% Saline: | 50 g |

Next, 35 g of the dispersion solution A1, 1 g of ethylene glycol dimethacrylate and 0.35 g of an polymerization initiator AIBN are weighed, then, thoroughly mixed and deaerated using a ultrasonic machine for 2 minutes. The solution is added to the above mixed solution C and the mixed solution is emulsified by an emulsifier. Next, the emulsion is poured into a bottle, which is then covered with a silicone lid and deaerated under vacuum by using an injection needle. The bottle is sealed by nitrogen gas. The emulsion is reacted at 65° C. for 15 hours in this condition to produce particles. The resulting microparticles powder is dispersed in ion exchange water, aqueous hydrochloric acid is used to decompose calcium carbonate and then subjected to filtration. The residue is washed with a plenty of distilled water to obtain unclassified white particles. These particles are allowed to pass through nylon screens having apertures of 10 μm and 15 μm to make particles have the same grain size. Then, the resulting particles are dried to obtain white particles having a volume average particles diameter of 13 μm.

Preparation of Red Particles-1

The following components are mixed and the mixture is subjected to ball mill crushing using a 10 mm φ zirconia ball for 20 hours in the same manner as in the case of the white particles to prepare a dispersion solution A2.

| Methylmethacrylate monomer: | 89 parts by mass |
|---|---|
| Diethylaminoethylmethacrylate monomer: | 0.3 parts by mass |
| Red colorant described above: | 10 parts by mass |

An unclassified red particles product is produced in the same manner as in the case of the foregoing production of the white particles-1 except that the dispersion solution A2 is used in place of the dispersion solution A1. As to the grain size control, these particles are allowed to pass through nylon screens having apertures of 10 μm and 15 μm to make particles have the same grain size. Then, the resulting particles are dried to obtain the red particles-1 having an average particles diameter of 13 μm. These particles have a grain size distribution d10vol/d90vol of 1.2.

Preparation of Red Particles-2

The following components are mixed and the mixture is subjected to ball mill crushing using a 10 mmφzirconia ball for 20 hours in the same manner as in the case of the white particles to prepare a dispersion solution A3.

| Methylmethacrylate monomer: | 89 parts by mass |
|---|---|
| Diethylaminoethylmethacrylate monomer: | 0.3 parts by mass |
| Quinacridon red colorant (trade name: Chromofine Red 6820, manufactured by Dainichi Seika Color & Chemicals., Ltd.) | 6 parts by mass |

An unclassified red particles product is produced in the same manner as in the case of the foregoing production of the white particles-1 except that the dispersion solution A3 is used in place of the dispersion solution A1. As to the grain size control, these particles are allowed to pass through nylon screens having apertures of 10 μm and 15 μm to make particles have the same grain size. Then, the resulting particles are dried to obtain the red particles-2 having an average particles diameter of 13 μm. These particles have a grain size distribution d10vol/d90vol of 1.2.

Example 1

A fixed amount of a mixture of particles prepared by blending the white particles-1 with the red particles-1 as the particles 18 and 20 for display devices in a ratio (mass ratio) of 6:5 is used to manufacture an image display medium and an image forming device according to the first embodiment.

Comparative Example

A fixed amount of a mixture of particles prepared by blending the white particles-1 with the red particles-2 as the particles 18 and 20 for display devices in a ratio (mass ratio) of 6:5 is used to manufacture an image display medium and an image forming device according to the first embodiment.

Next, a 200 V electric field is applied across the electrodes to allow the red particles to travel to the electrode side thereby displaying a red image. When the image obtained using the red particles-1 is compared with the image obtained using the red particles-2 to evaluate functionally, the image using the red particles-1 has high color saturation, exhibiting a bright red color. On the other hand, the image using the red particles-2 has small tinting strength, exhibiting a pale red color as a whole. When these images are respectively irradiated with ultraviolet rays, the image using the red particles-1 is not almost deteriorated whereas the image using the red particles-2 is seen to be more dropped in density than in the initial stage.

It is found from this result that high tinting strength and high fastness can be attained when the particles for display device of the invention are used.

The invention provides a colorant which highly develops a color and is superior in light fastness, particles for display device using the colorant, and an image display medium and an image forming apparatus using the particles for display device of the invention.

What is claimed is:

1. A colorant comprising a particulate base material and particles having the color strength due to the surface plasmon resonance, the particles being supported on or contained in the particulate base material.

2. The colorant of claim 1, wherein the particles having the color strength due to the surface plasmon resonance are metal colloid particles.

3. The colorant of claim 2, wherein the metal colloid particles are gold or silver.

4. The colorant of claim 1, wherein the particulate base material is an inorganic compound.

5. The colorant of claim 4, wherein the inorganic compound is at least one compound selected from titanium oxides and zeolite.

6. The colorant of claim 1, wherein the particulate base material is a polymer compound.

7. The colorant of claim 6, wherein the polymer compound contains an inorganic white pigment.

8. The colorant of claim 7, wherein the inorganic white pigment is at least one pigment selected from titanium oxides and zeolite.

9. The colorant of claim 1, further comprising a coating layer covering the particulate base material.

10. Particles for display device comprising a colorant and a resin, wherein the colorant contains a particulate base material and particles having the color strength due to the surface plasmon resonance, the particles having the color strength due to the surface plasmon resonance being supported on or contained in the particulate base material.

11. An image display medium comprising a pair of substrates disposed so as to face each other and a particle group containing at least two types of display particles, the particle group being sealed in the gap between the pair of substrates, the medium having the characteristics that at least one type among the display particles can be charged positively by external stimulation and at least one other type can be charged negatively by external stimulation, and the color of the display particles which can be charged positively by external stimulation is different from the display particles which can be charged negatively by external stimulation, wherein at least one type of the display particles is particles for display device containing a colorant, and a resin and the colorant contains a particulate base material and particles having the color strength due to the surface plasmon resonance, the particles being supported on or contained in the particulate base material.

12. An image forming apparatus comprising:

an image display medium comprising a pair of substrates disposed so as to face each other and a particle group containing at least two types of display particles, the particle group being sealed in the gap between the pair of substrates, the medium having the characteristics that at least one type among the display particles can be charged positively by external stimulation, and at least one other type can be charged negatively by external stimulation, and the color of the display particles which can be charged positively by external stimulation is different from the display particles which can be charged negatively by external stimulation, wherein at least one type of the display particles is particles for display device containing a colorant and a resin, and the colorant contains a particulate base material and particles having the color strength due to the surface plasmon resonance, the particles being supported on or contained in the particulate base material; and an electric field generating device that generates an electric field corresponding to image information, the device being interposed between the pair of substrates.

* * * * *